United States Patent
Case, Jr. et al.

(10) Patent No.: US 12,284,516 B1
(45) Date of Patent: *Apr. 22, 2025

(54) CONTROLLING A DEVICE THAT OPERATES IN A MONITOR MODE

(71) Applicant: Amazon Technologies, Inc., Seattle, WA (US)

(72) Inventors: Bryce Edward Case, Jr., Colorado Springs, CO (US); Timothy Glenn Suter, Melbourne (AU)

(73) Assignee: Amazon Technologies, Inc, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/543,820

(22) Filed: Dec. 18, 2023

Related U.S. Application Data

(63) Continuation of application No. 17/178,951, filed on Feb. 18, 2021, now Pat. No. 11,895,493.

(51) Int. Cl.
*H04W 12/06* (2021.01)
*H04W 76/10* (2018.01)

(52) U.S. Cl.
CPC ......... *H04W 12/068* (2021.01); *H04W 76/10* (2018.02)

(58) Field of Classification Search
CPC ..... H04W 12/50; H04W 12/06; H04W 84/12; H04W 12/04; H04W 76/11; H04W 76/14; H04W 48/08; H04W 48/12; H04W 48/16; H04W 52/0229; H04W 76/23; H04W 8/005; H04W 84/18; H04W 12/02; H04W 12/062; H04W 12/069; H04W 12/10; H04W 12/12; H04W 12/122;

(Continued)

(56) References Cited

U.S. PATENT DOCUMENTS 8,464,061 B2 * 6/2013 Bradley ............... H04W 12/50
713/168
9,301,141 B1 * 3/2016 Mincher ............ H04L 63/1433
(Continued)

FOREIGN PATENT DOCUMENTS

EP      2701447 A1 *  2/2014 ........... H04L 9/3236
WO  WO-2005008901 A2 *  1/2005 ........... H04W 12/06

OTHER PUBLICATIONS

U.S. Appl. No. 17/178,951, "Final Office Action," mailed Jun. 7, 2023, 20 Pages.

(Continued)

*Primary Examiner* — Matthew C Sams
(74) *Attorney, Agent, or Firm* — Kilpatrick Townsend & Stockton LLP

(57) ABSTRACT

Techniques are described for controlling a first device that operates in a first mode. In an example, the first device receives, while it is operating in a first mode, a secret from a second device. The first device is capable of wireless data reception and incapable of wireless data transmission in the first mode. The first device determines that the secret is valid. Based at least in part on the secret being valid, the first device performs at least one of: switching an operational mode of the first device from the first mode to a second mode, or performing, while operating in the first mode, a command indicated by the second device. The first device is capable of the wireless data transmission in the second mode.

20 Claims, 11 Drawing Sheets

(58) Field of Classification Search
CPC ..... H04W 12/63; H04W 12/65; H04W 12/77; H04W 28/02; H04W 4/20; H04W 4/23; H04W 4/80; H04W 40/244; H04W 40/248; H04W 40/36; H04W 52/02; H04W 52/0206; H04W 52/0241; H04W 76/10; H04W 76/27; H04W 76/30; H04W 76/45; H04W 84/047; H04W 88/02; H04W 88/04; H04W 88/06; H04W 92/18; H04L 63/0823; H04L 41/0806; H04L 2209/80; H04L 2463/141; H04L 41/0846; H04L 41/28; H04L 63/061; H04L 63/0876; H04L 63/101; H04L 63/102; H04L 63/1458; H04L 63/1466; H04L 63/1475; H04L 67/306; H04L 9/0844; H04L 9/3236; H04L 9/3242; H04L 9/3263; H04L 9/3273

See application file for complete search history.

(56) References Cited

U.S. PATENT DOCUMENTS

| | | | | |
|---|---|---|---|---|
| 10,547,613 | B1* | 1/2020 | Roths | H04L 9/0844 |
| 10,595,266 | B2* | 3/2020 | Liu | H04W 48/16 |
| 11,895,493 | B1* | 2/2024 | Case, Jr. | H04W 76/10 |
| 11,962,842 | B1* | 4/2024 | Singh | H04N 21/4753 |
| 2009/0137262 | A1* | 5/2009 | Willenegger | H04W 74/002 |
| | | | | 455/515 |
| 2009/0228707 | A1* | 9/2009 | Linsky | H04L 63/1475 |
| | | | | 380/283 |
| 2012/0054493 | A1* | 3/2012 | Bradley | H04W 12/50 |
| | | | | 713/168 |
| 2012/0072751 | A1* | 3/2012 | Das | H04W 76/45 |
| | | | | 709/224 |
| 2015/0061970 | A1* | 3/2015 | Kim | G06F 3/1423 |
| | | | | 345/2.3 |
| 2018/0034690 | A1* | 2/2018 | Sivarajan | H04W 4/50 |
| 2018/0199265 | A1* | 7/2018 | Liu | H04W 48/16 |
| 2019/0150093 | A1* | 5/2019 | Kweon | H04W 76/30 |
| | | | | 370/311 |
| 2020/0178079 | A1* | 6/2020 | Xu | H04W 12/033 |
| 2021/0251019 | A1* | 8/2021 | Sayed | H04L 41/0806 |

OTHER PUBLICATIONS

U.S. Appl. No. 17/178,951, "Non-Final Office Action," mailed Dec. 6, 2022, 15 pages.

U.S. Appl. No. 17/178,951, "Notice of Allowance," mailed Sep. 20, 2023, 9 pages.

* cited by examiner

CONTROLLING A DEVICE THAT OPERATES IN A MONITOR MODE

CROSS-REFERENCE TO RELATED APPLICATIONS

This application is a continuation claiming priority to and the benefit of U.S. application Ser. No. 17/178,951, filed on Feb. 18, 2021, and titled "CONTROLLING A DEVICE THAT OPERATES IN A MONITOR MODE," the contents of which are herein incorporated in their entirety for all purposes.

BACKGROUND

Most computing devices, such as consumer electronics, support wireless connectivity. Typically, a computing device connects to a wireless access point that provides access to a data network. In many cases, the data network is a secure home network and is accessible to the computing device based on a credential, such as a passphrase. In such cases, the computing device may need to send the credential to the wireless access point in order to join the secure home network. In many situations, providing the credential may include input at an interface of the computing device.

BRIEF DESCRIPTION OF THE DRAWINGS

Various embodiments in accordance with the present disclosure will be described with reference to the drawings, in which.

DETAILED DESCRIPTION

Figure 1:
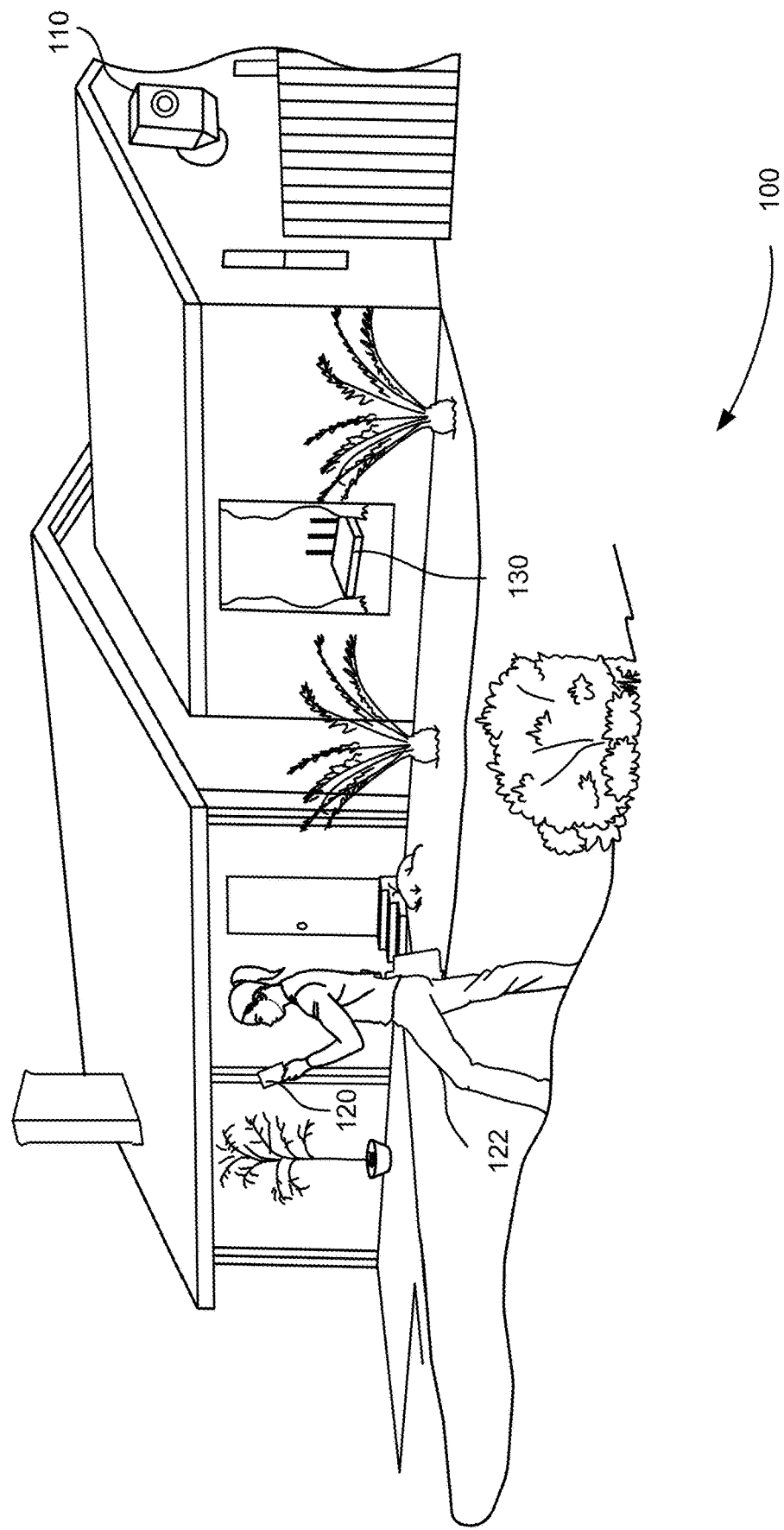
FIG. 1 illustrates an example of a computing environment for remotely controlling a computing device in a monitor mode, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure relate to, among other things, remotely controlling a computing device that operates in a monitor mode. In an example, the computing device can support multiple operational modes including, for instance, the monitor mode and one or more other modes. In the monitor mode, the computing device is capable of wireless data reception but no wireless data transmission. In other words, the computing device may not transmit data (e.g., broadcast beacons) and is radio invisible (e.g., not detectable based on wireless communications) to other devices. In the other mode(s), the wireless data transmission is enabled, whereby the computing device can transmit data and is, hence, radio visible to other computing devices. While operating in the monitor mode, the computing device can receive a secret from another device. Upon validating the secret, the computing device can switch to operating in one of the other modes or, alternatively, can remain in the monitor mode and perform a command sent from the other device. In this way, the use of a secret in the monitor mode to switch operational modes or to perform commands enables a command and control channel from the other device. The other device needs to transmit a valid secret in order to remotely control the computing device in the monitor mode. In this situation, the computing device remains radio invisible (until switching to the other mode), while being controlled from the other device. If an invalid secret is transmitted, the computing device can ignore any received data, would not be remotely controlled, and would remain radio invisible.

To illustrate, consider an example of a smart security camera that uses 802.11 Wi-Fi communication protocols. A user may install this computing device at a hard to reach location (e.g., the roof of a house) and may need to provision it to connect to an access point of a home network. Upon the first power on, the smart security camera may operate in the monitor mode. While in this mode, the smart security camera receives a probe request from a smartphone (or a computing device that may already be a node of the home network). The probe request includes a hash of an identifier of the smart security camera (e.g., a hash of its serial number). The smart security camera compares the received hash to a hash that is pre-stored in its local memory. Upon determining a match between the two hashes, the smart security camera switches from the monitor mode to a setup mode. In the setup mode, the smart security camera may transmit a request for a service set identifier (SSID) and a credential. In response, the smartphone transmits the SSID and the credential of the access point to the smart security camera. Thereafter, the smart security camera completes an association process with the access point by using the SSID and credential, thereby joining the home network. Once the setup is complete, the smart security camera switches from the setup mode to a client mode, whereby the smart security camera becomes capable of data communications with other nodes on the home network and, as applicable, on other data networks (e.g., via a public network such as the Internet). In this way, by initially using the monitor mode, the smart security camera remains radio invisible until receiving a valid secret (e.g., the hash). By doing so, the risk of unauthorized control and provisioning of the smart security device is significantly reduced. Further, the monitor mode can be re-used as needed upon, for example, a reboot, dissociation from the access point (because of a change to the SSID and/or credential), or a reconnection to the home network (e.g., because of a new access point). In addition to simplifying the initial provisioning, the re-use of the monitor mode simplifies the re-provisioning of the smart security camera without the need of physical access thereto, thereby improving the overall user experience (especially when this computing device is installed at a hard to reach location).

By using a secret to effectuate remote controls over a computing device in a monitor mode, multiple technological advantages can be achieved. For example, the remote controlling is relatively more secure than that of other data transmission-enabled operational modes because the computing device remains radio invisible and is not responsive until a valid secret is detected. Further, the remote controlling permits communications to the computing device without the need for the computing device to join a data network (e.g., the communications can be from only the device that sent the secret). When the computing device is in a hard to reach location (or lost by a user) and disconnected from a data network, the overall user experience can also be improved because the user can communicate with the computing device (e.g., from their smartphone or another device) without the need to have physical access to the computing device. These various improvements can be achieved without necessitating a change to the hardware of the computing device and can involve a re-purposing of the monitor mode. These and other technological improvements are described in connection with the next figures.

In the interest of clarity of explanation, embodiments of the present disclosure are described in connection with 802.11 Wi-Fi communication protocols. However, the embodiments of the present disclosure are not limited as such and, instead, similarly apply to other wireless communication protocols including, for instance, Bluetooth, Zigbee, and the like. Further, particular examples of a computing device type and remote controls (e.g., connecting a smart security camera to a home network, or commanding the security camera to arm or disarm). However, the embodiments of the present disclosure are not limited as such and, instead, similarly apply to other computing device types (e.g., any end user device, IoT device, sensor, or computing device capable of wireless data reception and transmission) and other remote controls (e.g., to command an e-reader or table to beep or turn on its screen, to command a drone to fly or land, to push a software update to a computing device, and the like).

FIG. 1 illustrates an example of a computing environment 100 for remotely controlling a computing device 110 in a monitor mode, according to embodiments of the present disclosure. The computing device 110 is a first device that is controlled by another computing device 120 (e.g., a second device) while being in the monitor mode. In the interest of clarity of explanation, the computing device 110 and the other computing device 120 are referred to herein as a controlled device 110 and a controlling device 120, respectively.

The controlled device 110 can be any type of computing device that includes one or more processors, one or more memories, and one or more radios (including one or more wireless network interfaces) and that implements wireless communication protocols, such as 802.11 Wi-Fi communication protocols. In the illustrative example of FIG. 1, the controlled device 110 is a smart security camera installed on a wall of a house. Nonetheless, the controlled device 110 can be of a different type, such as a smartphone, tablet, e-reader, smart watch, wearable device, smart speaker, smart appliance, IoT device, sensor, and the like.

In an example, the controlled device 110 supports multiple operational modes including, for instance, a monitor mode, a setup mode, and a client mode. In these various modes, the controlled device 110 can operate in the same power mode (e.g., at the same or substantially the same level of power of the power mode, such within plus or minus ten percent or some other predefined range). This power mode can be referred to as a high power mode to indicate that at least the radio components (e.g., radio frequency transceiver(s), filter(s), processor(s) and the like) are fully powered up and/or activated. Other operations modes exist in which the controlled device 110 can operate a relatively lower level of power, such as a sleep mode or a low power mode. In the monitor mode, the controlled device 110 is capable of wireless data reception and incapable of wireless data transmission. For instance, the monitor mode allows the controlled device 110 to monitor, via a radio controller (e.g., a wireless network interface controller (WNIC) or any other type of radio controller depending on the underlying communication protocol), all traffic received on a wireless channel (e.g., an 802.11 channel, or any other wireless channel depending on the communication protocol). In the setup mode, the controlled device 110 is capable of the wireless data reception and the wireless data transmission such that it can receive and send data to complete a setup. In an example, the setup can be to provision the controlled device 110 to connect to a home network via an access point 130. Accordingly, in the setup mode, the controlled device 110 is capable of associating with the access point 130, whereby the controlled device can receive an SSID and a credential of the access point 130 (e.g., from the controlling device 110) and transmit the credential to the access point 130 as part of the association process therewith. This setup mode can be also referred to as a provisioning mode (e.g., a mode in which the computing device is provisioned by sending and receiving data to and from a controlling device to complete a provisioning process). In the case of connecting the controlled device 110 to a wireless network, the setup mode can also be referred to as an unassociated mode to indicate that the device has not been associated with an access point of the wireless network and is performing an association process by sending and receiving data to and from a controlling device. In the client mode, the controlled device 110 is also capable of the wireless data reception and the wireless data transmission such that it can receive and send data with other devices. Referring back to the home network example, the controlled device 110 is connected with the access point 130, whereby this connection enables the controlled device 110 to communicate with other devices on the home network and/or other data networks.

The controlling device 120 can have similar components as the controlled device 110 and may, but need not, be of a different type. In an example, the controlling device 120 can be any type of computing device that includes one or more processors, one or more memories, and one or more radios (including one or more wireless network interfaces) and that implements wireless communication protocols, such as 802.11 Wi-Fi communication protocols. In the illustrative example of FIG. 1, the controlled device 110 is a smartphone operable by a user 122. Nonetheless, the controlled device 110 can be of a different type, such as a smart security camera, tablet, e-reader, smart watch, wearable device, smart speaker, smart appliance, IoT device, sensor, and the like. Here also, the controlling device 120 may, but need not, support multiple operational modes including a monitor mode, a setup mode, or a client mode. Generally, when the controlling device 120 is remotely controlling the controlled device 110, this control includes wireless data transmission and, thus, the operational mode of the controlling device 120 cannot be the monitor mode.

In an example, a trigger event occurs and relates to provisioning the controlled device 110 to connect to the home network. For instance, the trigger event can be a power on of the controlled device 110 (e.g., the first time the controlled device 110 is powered on after installation), a reboot of the controlled device 110 (e.g., upon power cycling or following a software update), a dissociation of the controlled device 110 from the access point 130 (e.g., due to a change to the SSID and/or the credential), or a connection attempt of the controlled device 110 to the home network (e.g., due to a change to the access point 130, the installation of a new access point, or some other network change).

Based on the trigger event, the controlled device 110 operates in the monitor mode. The user 122 is prompted via the controlling device 120 whether the controlled device 110 is to be provisioned. If so, the controlling device 120 transmits a secret (e.g., a hash of the controlled device's 110 identifier). Upon receiving and validating the secret, the controlled device 110 switches to the setup mode. In turn, the controlling device 120 sends the SSID and the credential to the controlled device 110. The controlled device 110 uses the SSID and the credential to complete the association process with the access point 130 (or any other access point, as applicable), thereby joining the home network. Upon completion of the association process, the controlled device 110 switches to the client mode.

In an example, a trigger event occurs and relates to remotely controlling the controlled device 110 while the controlled device 110 remains in the monitor mode. In this example, the controlled device 110 need not be connected to the home network. The trigger event can include user input at the controlling device 120 for a particular command (e.g., to arm or disarm the smart security camera). As such, the controlling device 120 transmits the secret and the command to the controlled device. Upon receiving and validating the secret, the controlled device 110 performs the command (e.g., arms or disarms).

If the controlled device 110 was connected to the home network and was operating in a non-monitor mode (e.g., in the client mode), the above remote control can still be effectuated. In particular, the controlling device 120 can transmit a first command for the controlled device 110 to switch to the monitor mode (e.g., here, the trigger event is this first command). Subsequently, the secret and the other command (e.g., arm or disarm) are transmitted.

As described above, two illustrative use cases have been provided: connecting the controlled device 110 to a home network and controlling the controlled device 110 to perform a particular command (e.g., arm or disarm in the case of a smart security camera). Other use cases are likewise possible and involve the use of a secret while the controlled device 110 is in the monitor mode. For instance, the controlled device 110 can be similarly connected to any type of wireless connections including a peer-to-peer connection, an ad-hoc network, or a mesh network. In another illustration, the controlled device 110 is a tablet or an e-reader and may, but need not, be disconnected from the home network. To locate it, the user 122 can operate the controlling device 120 to transmit the secret and a command to beep, turn on a screen, or emit a particular light color or pattern. If the tablet or e-reader is disconnected, it can use the disconnection as the trigger event to operate in the monitor mode, can receive the secret, and perform the command. If the tablet or e-reader is not disconnected, the controlling device 120 can first send a command for entering the monitor mode. In a further illustration, the controlled device 110 is an IoT device. Before connecting it to the home network, a software update may need to be pushed to the IoT device. This software update may be downloaded to the controlling device 120 via a secure channel first. Thereafter, the controlling device 120 can send the secret followed by the software update. In this way, the IoT device can validate the secret and download the software update from the controlling device 120. In yet another illustration, the controlled device 110 can be a drone within a fleet of drones. Each of the drones can store the same secret, such that the secret is shared across the fleet. The user 122 may operate the controlling device 120 to transmit a fly or land command (or any other drone command). In turn, the controlling device 120 broadcasts the secret and the requested command. Upon validation of the secret, each of the drones can perform the command. In this way, a single user input (e.g., selection via a user interface) can result in the entire fleet performing the requested command.

Figure 2:
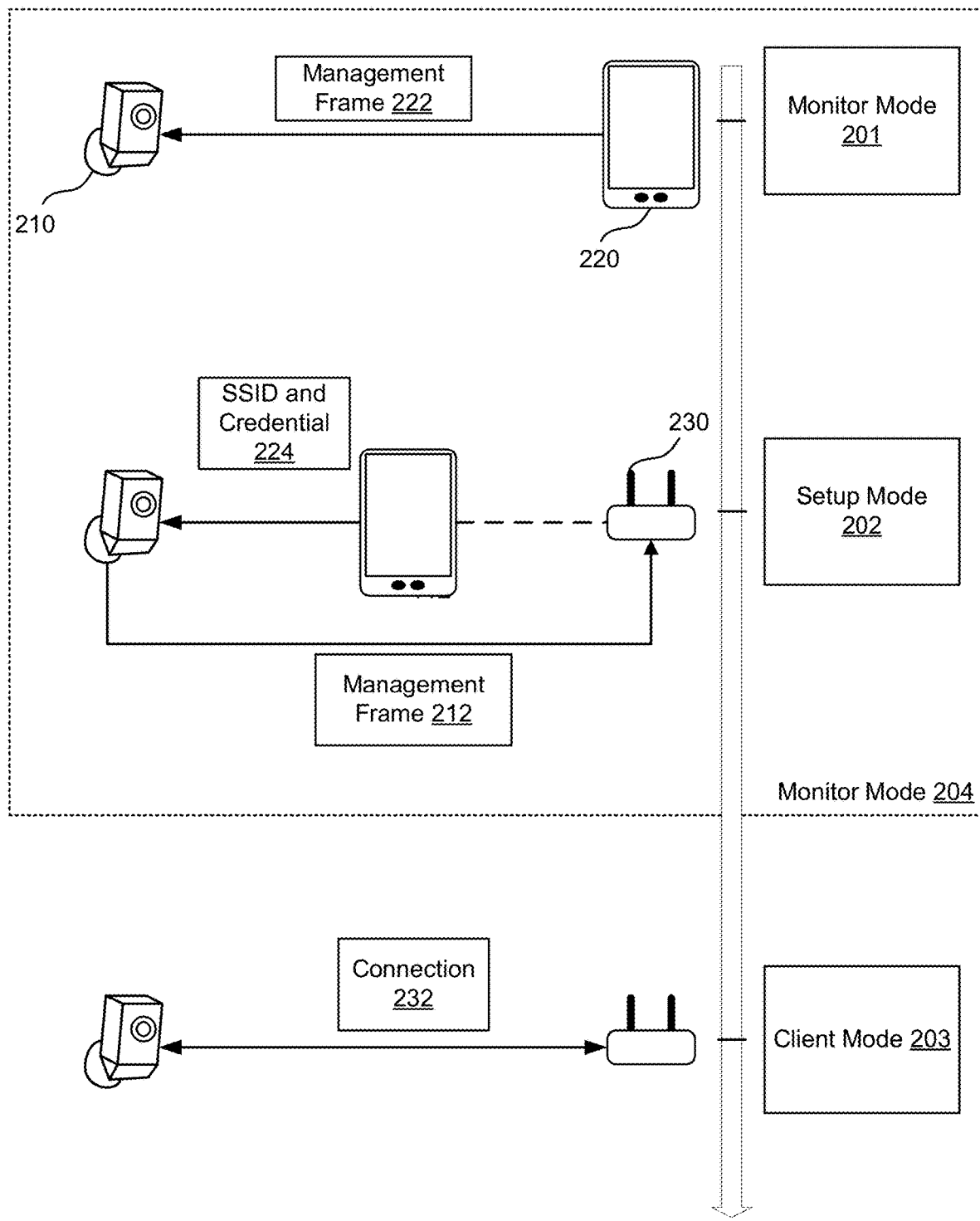
FIG. 2 illustrates an example of provisioning a computing device in a monitor mode to connect to a data network, according to embodiments of the present disclosure.

FIG. 2 illustrates an example of provisioning a computing device in a monitor mode to connect to a data network, according to embodiments of the present disclosure. In the illustration of FIG. 2, the computing device is a controlled device 210, whereby a controlling device 220 can remotely control it in the monitor mode. The data network can be a home network or some other secure network, whereby access thereto is provided via an access point 230. Given the secure nature of this network, the access may necessitate a credential, such as a passphrase. The provisioning includes enabling the controlled device 110 to receive the credential. Generally, the provisioning includes multiple stages, each corresponding to an operational mode of the controlled device 210.

In a first stage, the controlled device 210 operates in a monitor mode 201. This operation can be based on a trigger event related to the provisioning. The controlling device 220 sends a management frame 222 to the controlled device 210, where this management frame 222 corresponds to a request for association between the controlled device 210 and the controlling device 220. The management frame 222 can be a probe request, an association request or any type of management frame available per the 802.11 Wi-Fi communication protocols (or the applicable wireless communication protocols) for device association. The management frame 222 can include a secret usable for validation. In an example, the secret is included in an SSID field of the management frame 222. For instance, the secret is a hash of an identifier of the controlled device 210 and is included in the SSID field. In other words, the secret (e.g., hash) is used as an SSID for the association requested by the controlling device 220.

While in the monitor mode 201, the controlled device 210 receives data. If a received frame does not include the secret, the frame is ignored (e.g., dropped). Upon receiving the management frame 222, the controlled device 210 determines the secret from it (e.g., from the SSID field). The controlled device 210 also validates the secret and, upon validation, does not drop the management frame 222. The validation can include comparing the received secret (e.g., a first secret) with another secret (e.g., a second secret) that is pre-stored in the local memory of the controlled device 210 or that is generated by the controlled device 210 (e.g., by hashing the identifier of the controlled device 210). If the two secrets match, the received secret is valid; otherwise, it is invalid. When the received secret is valid, the controlled device 210 switches to a setup mode 202.

In an example, before switching the setup mode 202, the controlled device 210 cannot respond to the management frame 222 (e.g., the probe request or the association response) from the controlling device because the controlled device 210 is operating in the monitor mode 201. In this case, the controlling device 220 can be programmatically configured (e.g., via an application executing on the controlling device 220 and that controls the transmission of the management frame 222) to ignore any error for not receiving a response. Alternatively, after switching to the setup mode 202, the controlled device 210 can send the needed response.

In a second stage that follows the first stage, the controlled device 210 operates in the setup mode 202. The controlled device 210 is not connected yet to the access point 230 (as illustrated with the dashed line). Before this connection is established, the controlled device 210 can receive the SSID and credential 224 needed for the connection from the controlling device 220. For example, the SSID and credential 224 are transmitted in a frame from the controlling device 220. The controlling device 220 can pre-store the SSID and credential 224. Additionally or alternatively, the controlling device 220 can pull the SSID and credential 224 from a user account managed at a server (e.g., stored in a computing cloud), where the controlled device 210 and the controlling device 220 are associated with the user account (e.g., registered with a service provider under this user account).

Variations to the reception of the SSID and credential 224 can exist. In a first variation, the SSID and credential 224 are received from a third device, rather than the controlling device 220. For instance, the controlling device 220 can send a request to the third device to transmit the SSID and credential 224 after sending the management frame 222. Alternatively, the controlling device 220 can send such a request to the server (e.g., to a service of the computing cloud) that, in turn, instructs the third device to transmit the SSID and credential 224. In yet another variation, the controlled device 210 can associate with the controlling device 220 or the third device, and request and receive the SSID and credential 224. In a further variation, the management frame 222 transmitted in the first stage can also include the SSID and credential 224. For instance, the management frame 224 can include a vendor specific field that contains the SSID and credential 224. In this case, no additional transmission may be needed in the second stage.

In yet another variation, illustrated with the dotted rectangle in FIG. 2, the controlled device 210 remains in a monitor mode 204 (similar or the same as the monitor mode 201) and receives the SSID and credential 224 while being in the monitor mode 204. For example, the management frame 222 sent from the controlling device 220 includes the SSID and credential 224, in addition to the secret. In certain situations, the byte length of the SSID and credential 224 may be larger than what is available in the management frame 222. In this case, the controlling device 220 can send the SSID and credential 224 in another management frame separately from the secret and/or can distribute the SSID and credential 224 in multiple management frames. Upon validating the secret from the management frame 222, the controlled device 210 can associate an identifier (e.g., the media access control (MAC) address) of the controlling device 220 with a trust level or trusted list of devices. Thereafter, and while being in the monitor mode 204, the controlled device 210 can receive and process management frames having the identifier without the need of such management frames to include the secret.

Once the SSID and credential 224 are received, the controlled device 210 initiates and completes an association process by using the SSID and credential 224 in one or more management frames 212 transmitted by the controlled device 210 to the access point 230. The association process can include any or all of transmitting a probe request, receiving one or more probe responses, authentication, transmitting an association request, and receiving an association response. The probe request can be transmitted to discover nearby access points. One or more SSIDs may be received in corresponding probe response(s). The controlled device 210 can determine that a received probe response includes the SSID to then use the credential for authentication, followed by the association request and association response. Upon completion of the association with the access point 230, the controlled device 210 switches to operating in a client mode 203.

In a third stage that follows the second stage, the controlled device 210 operates in the client mode 203. In this stage, the controlled device 210 has a connection 232 (e.g., a Wi-Fi channel) with the access point 230. Data can be received and transmitted by the controlled device 210 to other computing devices via the access point 230 and over the connection 232.

Figure 3:
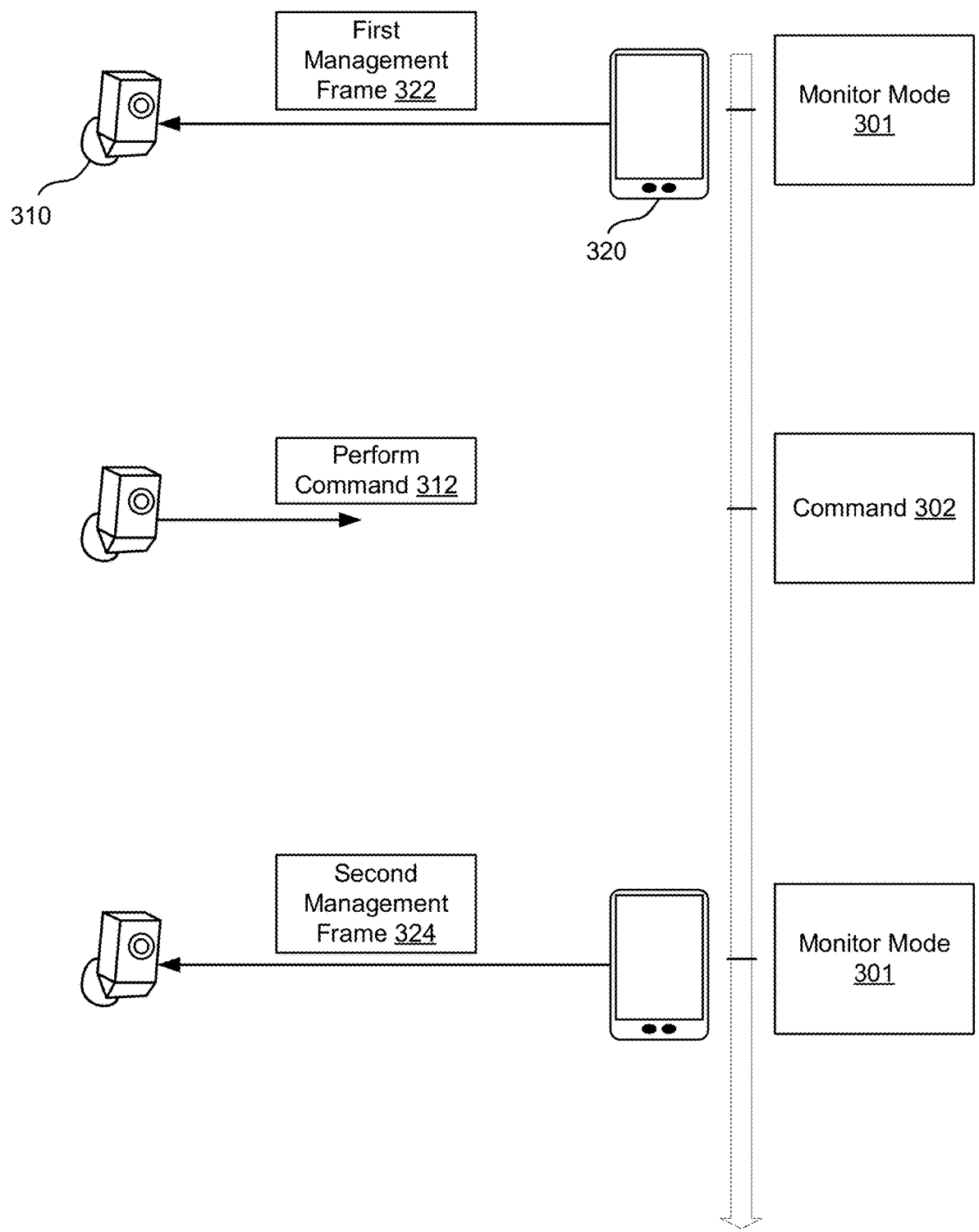
FIG. 3 illustrates an example of instructing a computing device in a monitor mode to perform a command, according to embodiments of the present disclosure.

FIG. 3 illustrates an example of instructing a computing device in a monitor mode to perform a command, according to embodiments of the present disclosure. In the illustration of FIG. 3, the computing device is a controlled device 310, whereby a controlling device 320 can remotely control it while it is in a monitor mode 301. The remote control here relates to performing a command 302 while the controlled device 310 remains in the monitor mode 301 (e.g., without the need of the controlled device 210 to switch to a different operational mode). Generally, the remote controlling includes multiple stages, each completed while the controlled device 310 operates in the monitor mode 301.

In an example, the controlled device 310 operates in a monitor mode 301 based on a trigger event. For instance, the monitor mode 301 is the operational mode of the controlled device 310 when it is not associated with an access point or is not connected to a home network. In another illustration, the controlled device 310 is connected to a home network and is in a client mode. The controlling device 320 (or another device) can trigger the controlled device 310 to switch to the monitor mode 301 by sending a request thereto.

In a first stage, the controlled device 310 receives a first management frame 322 from the controlling device 310. In an example, the first management frame 322 indicates a secret and the command 302. In this example, the first management frame 322 corresponds to a request for association between the controlled device 310 and the controlling device 320. The first management frame 322 can be a probe request, an association request or any type of management frame available per the 802.11 Wi-Fi communication protocols (or the applicable wireless communication protocols) for device association. The secret can be included in an SSID field of the first management frame 322. For instance, the secret is a hash of an identifier of the controlled device 310 and is included in the SSID field. In other words, the secret (e.g., hash) is used as an SSID for the association requested by the controlling device 320. Further, the first management frame 322 can include a vendor-specific field that contains information about the command 302. The command can correspond to a set of instructions executable on the controlled device 310, whereby the execution corresponds to the controlled device 310 performing the command.

Upon receiving the first management frame 322, the controlled device 310 determines the secret from it (e.g., from the SSID field). The controlled device 310 also validates the secret and, upon validation, does not drop the first management frame 322. The validation can include comparing the received secret (e.g., a first secret) with another secret (e.g., a second secret) that is pre-stored in the local memory of the controlled device 310 or that is generated by the controlled device 310 (e.g., by hashing the identifier of the controlled device 210). If the two secrets match, the received secret is valid; otherwise, it is invalid (in which case the received frame can be dropped). When the received secret is valid, the controlled device 310 further determines the command 302 (e.g., from the information in the vendor specific field) to then perform 312 the command 302 by executing the corresponding set of instructions. Performing 312 the command 302 corresponds to a second stage that follows the first stage. Once the command 302 is performed, a third stage can follow the second stage.

Like in the first and second stages, the controlled device 310 remains in the monitor mode 301 in the third stage. A second management frame 324 can be received and can indicate the secret and a second command. If so, the controlled device 310 does not drop the second management frame 324 and, instead, validates the secret to then perform the second command while remaining in the monitor mode 301.

In an example, the controlled device 310 continues to operate in the monitor mode 301, and no response is transmitted upon the processing of the first management frame 322 or the second management frame 324. In this case, the controlling device 320 can be programmatically configured (e.g., via an application executing on the controlling device 320 and that controls the transmission of management frames to the controlled device 310) to ignore any error for not receiving a response to a transmitted management frame.

Variations to the reception of the secret and the command 302 can exist. For example, the secret and the command 302 can be transmitted in different management frames. In particular, the secret can be included in a first management frame, where this frame does not include the command 302. This variation can be implemented when the byte length of the command 302 may be larger than what is available in the first management frame 322. In this case, Upon the validation of the secret, the controlled device 310 determines an identifier of the controlling device 320 from this management frame (e.g., the MAC address of controlling device 320 from a source MAC address field in the header of the first management frame). Because the secret is valid, the controlled device 310 can assume that frames associated with the identifier are to be trusted. Accordingly, the controlled device 310 receives a second management frame, where this frame includes the command 302 but not the secret. Next, the controlling device 320 determines the identifier from the second management frame (e.g., the source MAC address) and that this identifier corresponds to a trusted device. Accordingly, the controlling device 320 further processes the second management frame to determine the command 302 (e.g., from the information in the vendor specific field). In this way, it may be sufficient to send the secret once (or a few number of times) rather than repeatedly with each management frame. In another variation, a received management frame can indicate multiple commands (e.g., by using different information in sub-fields of the vendor specific field, each of which corresponds to a command). In this way, the number of management frames can be reduced.

Figure 4:
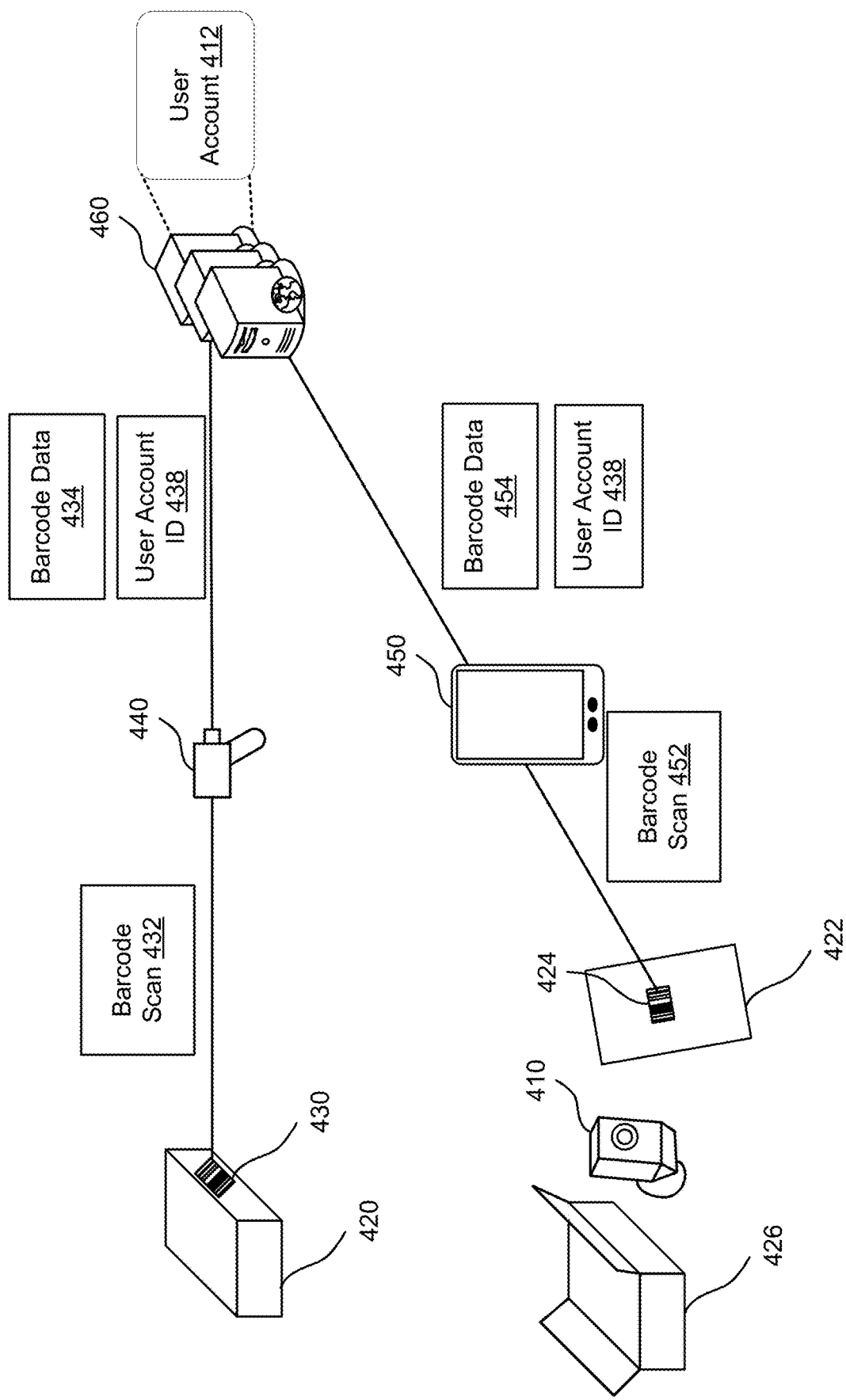
FIG. 4 illustrates an example of associating a computing device with a user account such that a secret may become available from the user account, according to embodiments of the present disclosure.

FIG. 4 illustrates an example of associating a computing device with a user account such that a secret may become available from the user account, according to embodiments of the present disclosure. In the illustration of FIG. 4, the computing device is a controlled device 410 to be controlled by a controlling device 450, where the controlled device 410 and the controlling device 450 are associated with the same user account 412.

Generally, the secret is a piece of information known to the controlled device 410 and the controlling device 450 and unknown to other devices, unless the piece of information is shared with such devices or is compromised (e.g., via hacking or reverse engineering). In the illustration of FIG. 4, the secret is a hash of an identifier of the controlled device 410. The identifier can be a serial number of the controlled device 410, although other possible salt for the hash is possible. The MAC address of the controlled device 410 can be used. However, because the MAC address can be determined from a management frame transmitted from the controlled device 450 (e.g., from the destination MAC address field), using the MAC address as the salt may be less secure than using the serial number of the controlled device 410. Other variations to the secret are possible, such as using a random number or a hash of a random number, a hash of a public key of the controlled device 410, and/or a combination of these different variations.

Two examples for generating the association with the user account 412 are illustrated in FIG. 4. In a first example, shown as starting in the top part of FIG. 4, the controlled device 410 is obtained (e.g., purchased) by a user from a service provider, where user account 412 corresponds to the user and is registered with the service provider. In this first example, the service provider can generate the association. In a second example, shown as starting in the bottom part of FIG. 4, the user obtains the controlled device 410 from a third party. In this example, the user (or the third party) can generate the association. Other examples for the generating the device-to-user account are also possible including, for instance, a conventional online registration of the controlled device 410 under the user account 412.

In the first example, the user orders a controlled device 410 from the service provider (e.g., purchases it online from a web site of the service provider). In a storage facility of the service provider, the controlled device 410 can be added to a container 420 for delivery to the user. A barcode 430 can be attached to the container 420 (e.g., to an external surface of this container 420) and can encode data related to the controlled device 410 (e.g., the serial number, a public key, and the like). Optionally, the barcode can also encode data about the user account 412 of the user. A remote device 440, such as a scanner at the storage facility (e.g., a handheld scanner or a product scanner in a workstation of the storage facility), performs a barcode scan 432 to read the barcode data 434 (e.g., the data encoded in the barcode 430). The remote device 440 is communicatively coupled with a server 460 (or, more generally, backend system) of the service provider and sends the barcode data 434 to this server 460.

In an illustration, the remote device 440 is on a same network with a central computer that manages purchase orders of users. The barcode data 434 is sent from the remote device 440 to this central computer and the central computer sends it to the server 460. The sent barcode data 434 includes, for instance, the serial number, the public key, and the like. In addition, if the barcode 430 encoded data about the user account, the barcode data 434 can include an identifier 438 of the user account 412. Otherwise, the server 460 can receive the user account identifier 438 separately from the barcode data 434. For instance, another barcode attached to the container 420 and/or printed in a purchase order encodes the user account identifier 438. Upon a scan of this barcode, the remote device 440 reads and sends the user account identifier 438 from this barcode to the server 460. Additionally or alternatively, the user account identifier 438 can be sent from the central computer based on a user purchase of the computing device and based on this central computer receiving the barcode data 434 from the remote device 440.

In turn, the server 460 receives the barcode data 434 and the user account identifier 438 and associates the controlled device 410 with the user account 412. For instance, the server 460 looks up the user account 412 based on the user account identifier 438 and adds to this account 412 some or all of the barcode data 434 including the serial number and device public key of the controlled device 410. The server 460 can be a computing component of the backend system of the service provider, where this backend system may store user accounts for different users and provide computing services (e.g., multimedia streaming) to computing devices of the users based on the user accounts. Although the embodiment illustrated in FIG. 4 is provided in relation to a barcode and a barcode scanner, other data entry methods and systems can be utilized, including radio frequency identifiers (RFIDs) or the like.

In the second example, rather than using a product scanner, the remote device can be the controlling device 450 (or any other device operable by the user). The controlling device 450 can execute a mobile application (e.g., an "app") to communicate with the backend system of the service provider based on a user login to the user account 412 via the mobile application. In this example, the user may receive a container 426 that includes the controlled device 410 and a sheet 422 (e.g., a paper, a brochure, a user manual, etc.). Alternatively, the information from the sheet 422 can be printed on the container 426 or on a label attached to the controlled device 410. The sheet 422 includes a barcode 424, similar to the barcode 430, encoding the above data. Upon opening the container 426, the user retrieves the controlled device 410 and the sheet 422 and uses the mobile application to perform a barcode scan 452 of the barcode 424 (e.g., to capture an image of the barcode 424). In turn, the mobile application reads the encoded data and sends barcode data 454 to the server 460. The sent barcode data 454 includes, for instance, the controlled device's 410 serial number and public key. In addition, if the barcode 430 encoded data about the user account, the barcode data 434 can include the user account identifier 438. Otherwise, the user account identifier 438 is determined based on the user login to the user account 412.

Here also, the server 460 receives the barcode data 454 and the user account identifier 438 and associates the controlled device 410 with the user account 412. For instance, the server 460 looks up the user account 412 based on the user account identifier 438 and adds to this account 412 some or all of the barcode data 454 including the controlled device's 410 serial number and public key.

In both examples, the association is complete and results in storing the controlled device's 410 serial number and public key under the user account 412. In use (e.g., to provision and/or command the controlled device 410), the controlling device 450 (or another computing device operated by the user) executes the mobile application, whereby the user is logged in to the user account 412 via this application. Based on the user login, the controlling device 450 can request and receive the secret from the server 460. For instance, the secret is a hash of the controlled device's 410 serial number. Further, the controlling device 450 can receive the controlled device's 410 public key and can use the public key to encrypt the secret and/or the information about the command sent in one or more management frames to the controlled device 410. By using encryption, transmission of management frames can become more secure, whereby the controlled device 410 is capable of decrypting the secret and/or command information by using its private key.

In an example, the secret and the private key are pre-stored at the controlled device 410. For instance, the secret and the private key are flashed into a memory of the controlled device 410 as part of the device manufacturing or the supply chain. In another example, the secret may not be pre-stored. Instead, the salt for the hash (e.g., the serial number) is pre-stored. In this example, upon receiving a management frame that includes a secret, the controlled device 410 can generate its own secret by hashing the serial number for comparison with the received secret.

Figure 5:
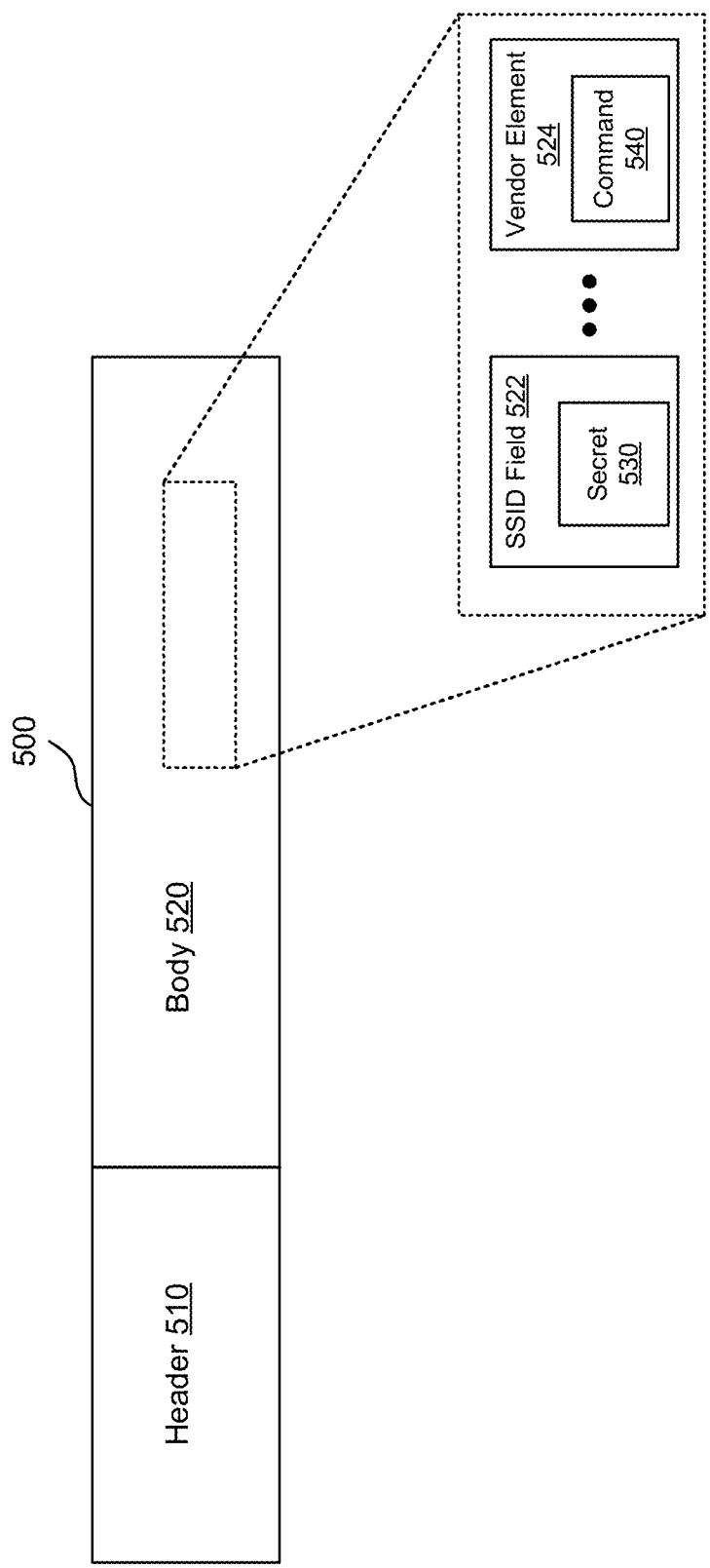
FIG. 5 illustrates an example of a frame structure for transmitting a secret to a computing device in a monitor mode, according to embodiments of the present disclosure.

FIG. 5 illustrates an example of a frame structure 500 for transmitting a secret 530 to a computing device (e.g., a controlled device) in a monitor mode, according to embodiments of the present disclosure. The frame structure 500 may, but need not, also include a command 540.

In an example, the frame structure 500 represents a structure of a management frame defined according to one or more communication protocols. In the case 802.11 Wi-Fi communication protocols, the management frame can be, for instance, a probe request or an association request.

Generally, the frame structure 500 includes a header 510 and a body 520. The specific fields under the header 510 and body 520 can vary depending on the underlying communication protocol(s). The header 510 contains information for the transmission of the management frame, such as a source MAC address and a destination MAC address among other information. The body 520 can include a payload of different types of information. Each information type can be contained in a field. For instance, an SSID field 522 can contain information about an SSID for use in the association between two devices (in the case the case 802.11 Wi-Fi communication protocols, the SSID field can be an SSID list). A vendor element 524 can contain additional information (in the case the case 802.11 Wi-Fi communication protocols, the vendor element 524 can be a vendor specific field).

In an example, the secret 530 is included in the SSID field 522 of the body 520. In other words, the frame structure 500 indicates the secret 530 by setting this secret 530 as the SSID for the association requested by the controlling device 220. Further, the command 540 is included in the vendor element 524. For instance, information about the command 540 is stored in this field of the body 520. As explained hereinabove, the secret 530 and the command 540 may, but need not, be indicated in the same management frame. If different management frames are used, these frames can have the same frame structure 500. However, in one of the management frames, only the secret 530 is indicated (e.g., a vendor element 524 is empty in this frame), and in another one of the management frames, only the command 540 is indicated (e.g., an SSID field 522 is empty in this frame).

In an example, the secret 530, the command 540, and/or other fields of a management frame can be encrypted. For instance, a controlling device uses the public key of the controlled device to encrypt the secret 530 and the command 540 (e.g., the information about the command 540). The encrypted information is stored in the applicable field(s) (e.g., in the SSID field 522 and/or the vendor element 524).

Figure 6:
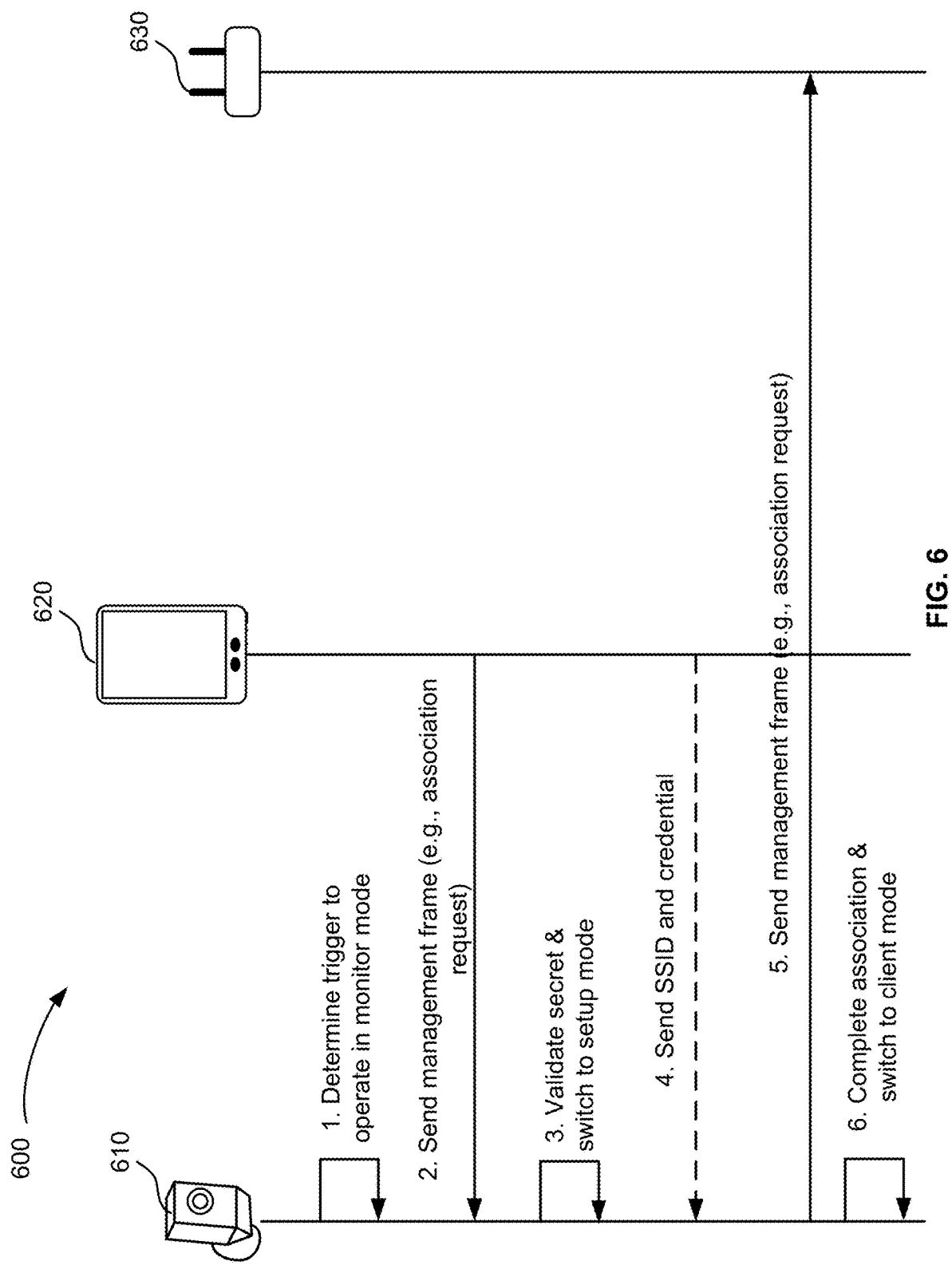
FIG. 6 illustrates an example of a sequence diagram for provisioning a computing device in a monitor mode to connect to a data network, according to embodiments of the present disclosure.

FIG. 6 illustrates an example of a sequence diagram 600 for provisioning a computing device in a monitor mode to connect to a data network, according to embodiments of the present disclosure. In the illustration of FIG. 6, the computing device is a controlled device 610, whereby a controlling device 620 can remotely control it in the monitor mode. The data network can be a home network or some other secure network, whereby access thereto is provided via an access point 630.

In a first step of the sequence diagram 600, the controlled device 610 determines a trigger event to operate in the monitor mode. For instance, the trigger event can be a power on, a reboot, a dissociation from the access point 630, a reconnection to the data network, or a default operational mode. In another illustration, the trigger event can be a request from the controlling device 620 for the monitor mode. Based on the trigger event, the controlled device 610 operates in the monitor mode.

In a second step of the sequence diagram 600, the controlling device 620 sends a management frame to the controlled device. For instance, the management frame can correspond to a request for an association between the controlling device 620 and the controlled device 610. In the case of 802.11 Wi-Fi communications protocol, this management frame can be a probe request or an association request that includes a secret in an SSID field.

In a third step of the sequence diagram 600, the controlled device 610 validates the secret and switches to a setup mode. For instance, the controlled device 610 determines the secret from the SSID field and compares this secret to a locally stored secret or to a locally generated secret. The comparison indicates a match and the match triggers the controlled device 610 to switch its operational mode from the monitor mode to the setup mode (e.g., a second mode).

In a fourth step of the sequence diagram 600, the controlling device 620 sends the SSID and the credential usable to connect to the access point 630. This step is illustrated with a dashed arrow because other variations are possible. As discussed in FIG. 2, the controlled device 610 can receive the SSID and the credential from a third device while being in the setup mode. Alternatively, the SSID and the credential can be indicated in the management frame that was received while the controlled device 620 was in the monitor mode (e.g. the SSID and the credential can be included in a vendor specific field in the case of 802.11 Wi-Fi communications protocol).

In a fifth step of the sequence diagram 600, the controlled device 610 sends a management frame to the access point 630. For instance, this management frame can be a probe request that initiates an association process with the access point 630.

In a sixth step of the sequence diagram 600, the controlled device 610 completes the association with the access point 630 and switches its operational mode from the setup mode to the client mode. For instance, the controlled device 610 receives a probe response from the access point 530 and determines that this response indicates the SSID. If so, the controlled device 610 uses the credential for authenticating itself to the access point 630, followed by an association request and an association response.

Figure 7:
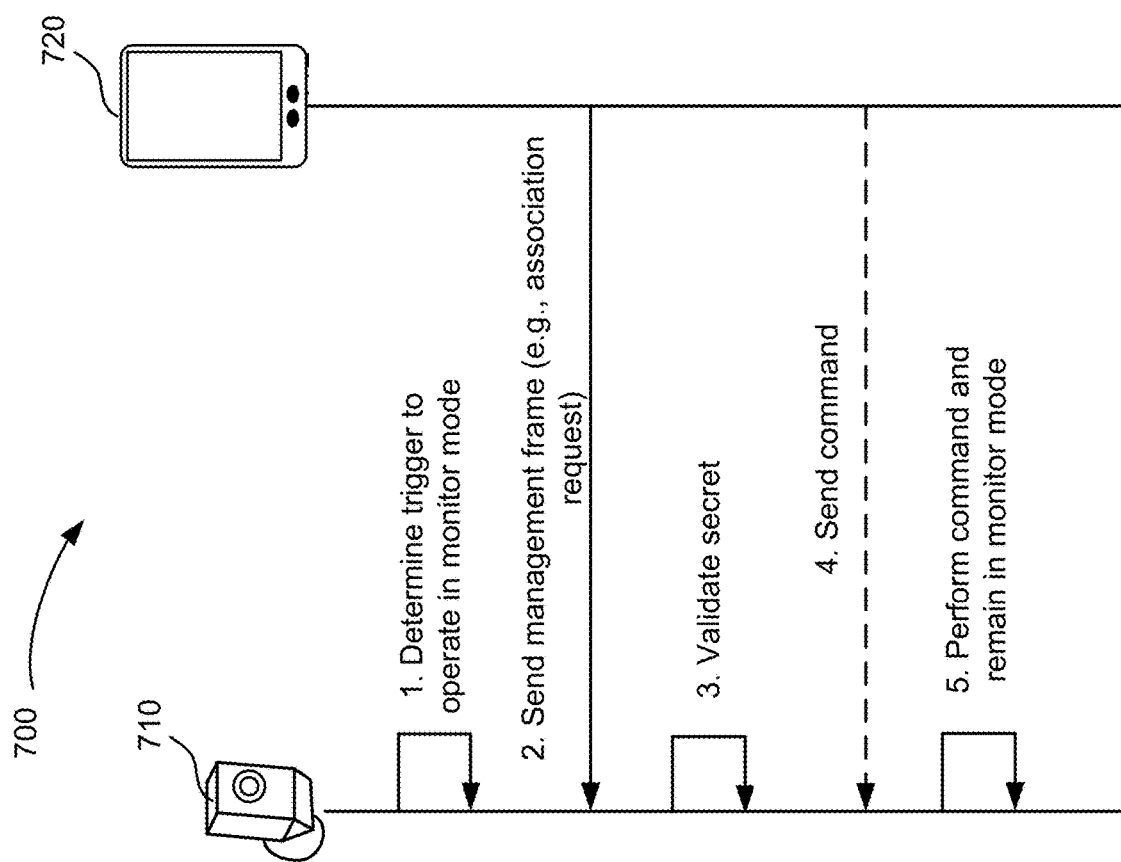
FIG. 7 illustrates an example of a sequence diagram for instructing a computing device in a monitor mode to perform a command, according to embodiments of the present disclosure.

FIG. 7 illustrates an example of a sequence diagram 700 for instructing a computing device in a monitor mode to perform a command, according to embodiments of the present disclosure. In the illustration of FIG. 7, the computing device is a controlled device 710, whereby a controlling device 720 can remotely control it in the monitor mode. The controlled device 710 need not be connected to a home network and, if connected thereto, can disconnect and switch its operational mode to a monitor mode.

In a first step of the sequence diagram 700, the controlled device 710 determines a trigger event to operate in the monitor mode. For instance, the trigger event can be a power on, a reboot, a dissociation from an access point, a disconnection from the data network or a default operational mode. In another illustration, the trigger event can be a request from the controlling device 720 for the monitor mode. Based on the trigger event, the controlled device 710 operates in the monitor mode.

In a second step of the sequence diagram 700, the controlling device 720 sends a management frame to the controlled device. For instance, the management frame can correspond to a request for an association between the controlling device 720 and the controlled device 710. In the case of 802.11 Wi-Fi communications protocol, this management frame can be a probe request or an association request that includes a secret in an SSID field.

In a third step of the sequence diagram 700, the controlled device 710 validates the secret. For instance, the controlled device 710 determines the secret from the SSID field and compares this secret to a locally stored secret or to a locally generated secret. The comparison indicates a match and the match triggers the controlled device 710 not to drop the management frame.

In a fourth step of the sequence diagram 700, the controlling device 720 sends a command (e.g., information about the command). For instance, a management frame is transmitted and includes the command information in a vendor specific field. This step is illustrated with a dashed arrow because other variations are possible. As discussed in FIG. 3, the management frame received under the second step can also include the command information. Therefore, the command information need not be transmitted in a separate management frame.

In a fifth step of the sequence diagram 700, the controlled device 710 performs the command and remains in the monitor mode. For instance, the controlled device 710 determines the command information from the vendor specific field and executes the corresponding set of instructions, where these instructions may be pre-stored in the memory of the controlled device 710.

Figure 8:
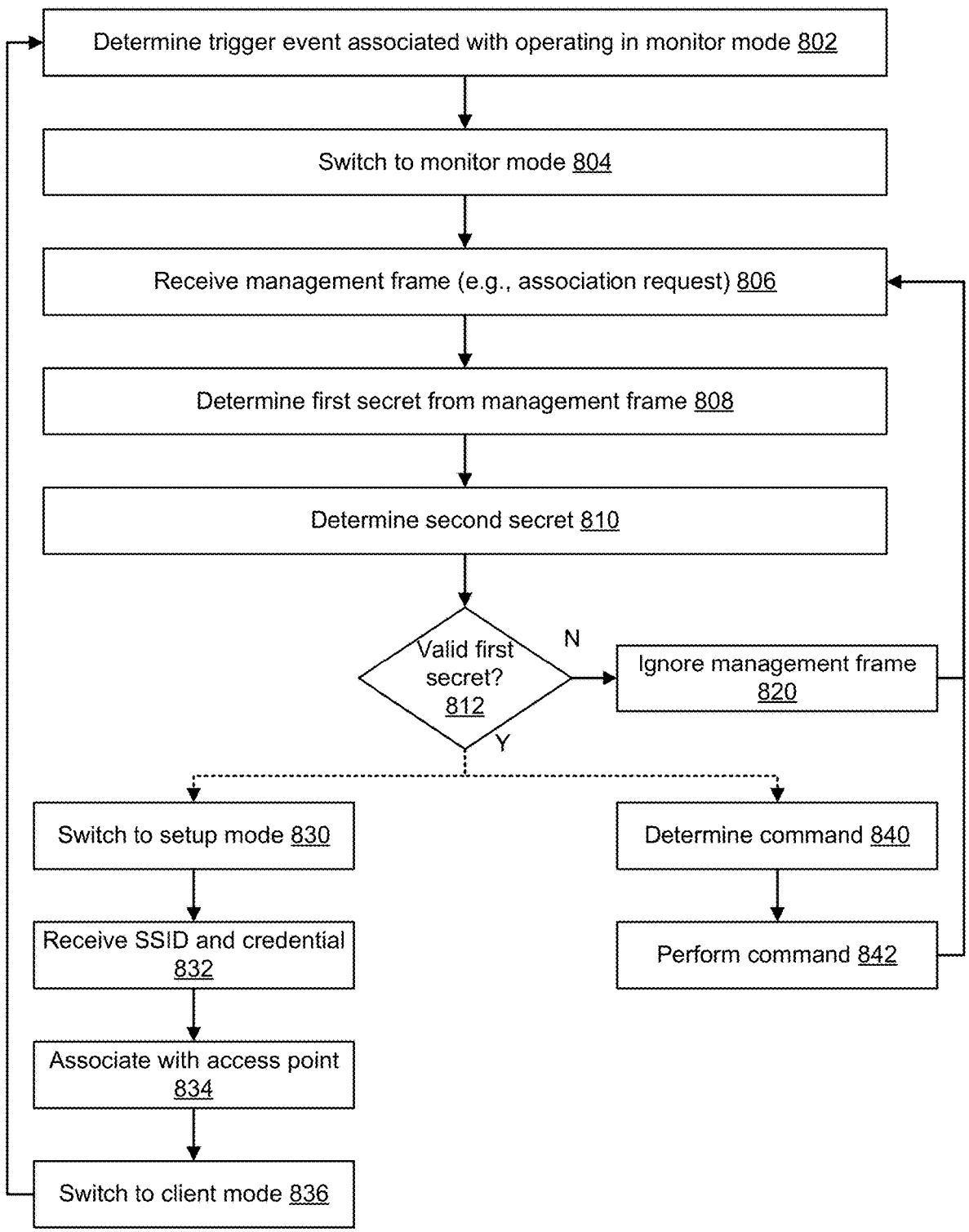
FIG. 8 illustrates an example of a flow executed by a computing device in a monitor mode, according to embodiments of the present disclosure.
Figure 9:
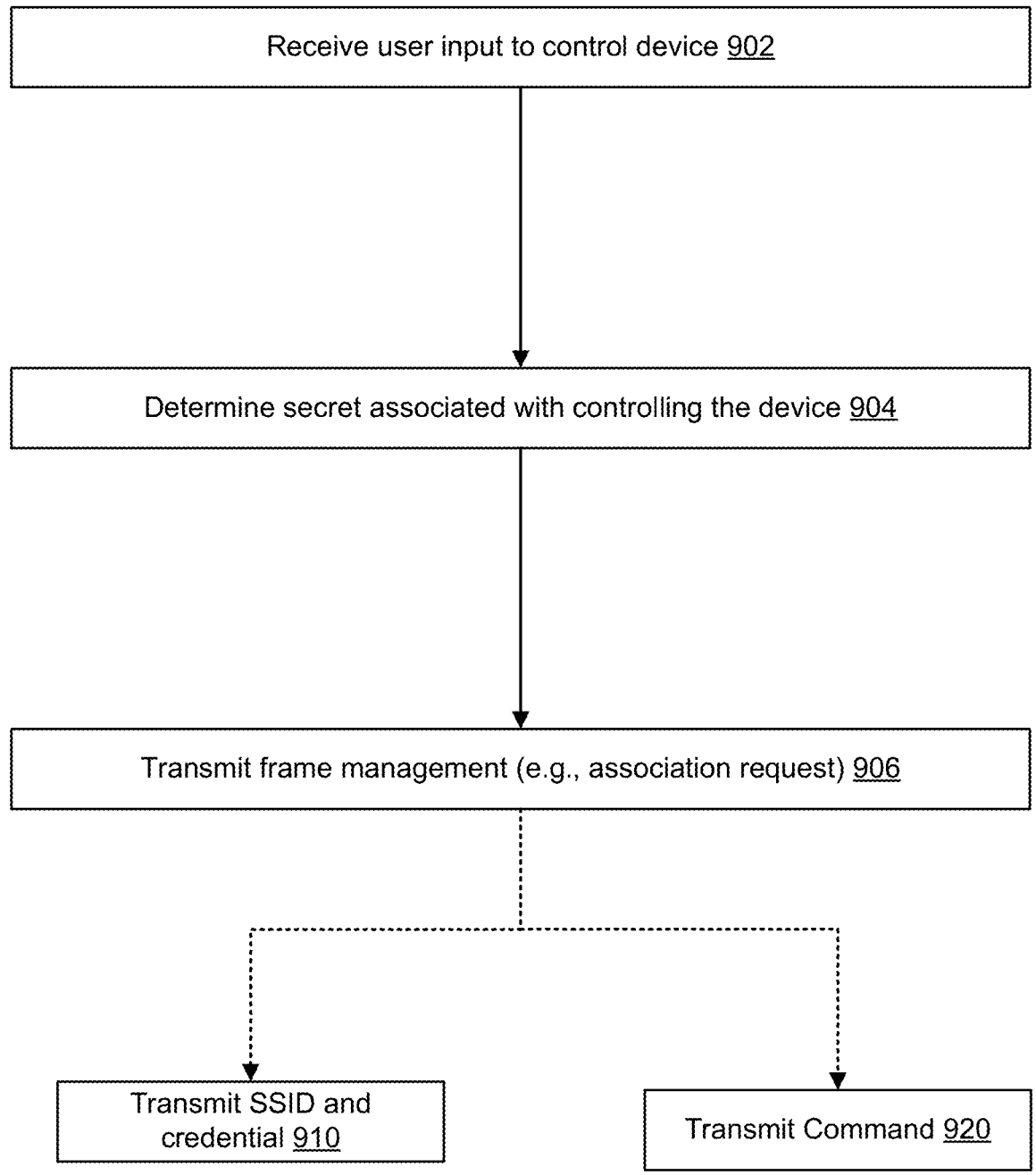
FIG. 9 illustrates an example of a flow executed by a computing device for remotely controlling another computing device in a monitor mode, according to embodiments of the present disclosure.

FIGS. 8-9 illustrate example flows for remote controlling a computing device operating in a monitor mode. A controlled device, similar to the controlled device 110 of FIG. 1, the controlled device 210 of FIG. 2, the controlled device 310 of FIG. 3, the controlled device 410 of FIG. 4, the controlled device 610 of FIG. 6, and the controlled device 710 of FIG. 7, is described as performing operations of the example flow of FIG. 8. A controlling device, similar to the controlling device 120 of FIG. 1, the controlling device 220 of FIG. 2, the controlling device 320 of FIG. 3, the controlling device 450 of FIG. 4, the controlling device 620 of FIG. 6, and the controlling device 720 of FIG. 7, is described as performing operations of the example flow of FIG. 9. Instructions for performing the operations can be stored as computer-readable instructions on one or more non-transitory computer-readable media of the relevant computing device (e.g., the controlled device for FIG. 8 and the controlling device for FIG. 9). As stored, the instructions represent programmable modules that include code or data executable by one or more processors of the relevant computing device. The execution of such instructions configures the relevant computing device to perform the specific operations shown in the corresponding figure and described herein. Each programmable module in combination with the respective processor(s) represents a means for performing a respective operation(s). While the operations are illustrated in a particular order, it should be understood that no particular order is necessary and that one or more operations may be omitted, skipped, and/or reordered.

FIG. 8 illustrates an example of a flow executed by a computing device (e.g., the controlled device) in a monitor mode, according to embodiments of the present disclosure. As illustrated, the flow can start at operation 802, where the controlled device determines a trigger event associated with operating in the monitor mode. At operation 804, the controlled device switches to operate in the monitor mode based on the trigger event. For instance, if the controlled device was operating in a second mode in which the capability of wireless data transmission is enabled, the switching can include disabling the capability. The disabling can involve deactivating radio frequency (RF) transmit circuitry of the controlled device or powering off this circuitry.

At operation 806, the controlled device receives a management frame. For example, the management frame is received from a second device (e.g., the controlling device) and corresponds to a request for an association between the two devices.

At operation 808, the controlled device determines a first secret from the management frame. For instance, the controlled device processes the management frame and extracts the first secret from an SSID field thereof. If the first secret is encrypted, the controlled device attempts to decrypt it, using its private key.

At operation 810, the controlled device determines a second secret. For instance, the second secret is pre-stored in a memory of the controlled device and is determined from the storage location in the memory. In another illustration, the controlled device generates the secret by, for example, inputting an identifier of the controlled device to a hash function.

At operation 812, the controlled device determines whether the first secret is valid. In an example, the first secret and the second secret are compared. If the comparison results in a match, the first secret is determined to be valid; otherwise, the secret is determined to be invalid. In a further example, if the first secret was encrypted, this comparison is performed only upon a successful decryption and the decrypted secret is compared to the second secret. If the decryption fails, the first secret is determined to be invalid. If invalid, operation 820 follows operation 812. Otherwise, operation 830 and/or operation 840 follow operation 812.

At operation 820, the controlled device has determined that the first secret is invalid. Accordingly, the controlled device ignores the management frame. For instance, the management frame is dropped and no further processing is performed thereon. A loop may exist to operation 806, where the controlled device remains in the monitor mode and can receive one or more additional management frames while operating in the monitor mode.

At operation 830, the controlled device has determined that the secret is valid. Operation 830 and operations 832-836 that depend therefrom can be performed to provision the controlled device. In particular, at operation 830, the controlled device switches its operational mode from the monitor mode to a setup mode based on the first secret being valid. The switching can include enabling the data transmission capability and any related application functionalities for setting up the controlled device.

At operation 832, the controlled device receives an SSID and a credential of an access point while operating in the setup mode. For instance, the SSID and the credential are received from the controlled device, although other devices can similarly send the SSID and the credential.

At operation 834, the controlled device associated with the access point. For instance, the controlled device uses the SSID and the credential to complete an association process with the access point, where this process can include transmission of a probe request, reception of a probe response, authentication, transmission of an association request, and reception of association response.

At operation 836, the controlled device switches its operational mode from the setup mode to a client mode. Here, the association with the access point is complete. The switching can include deactivating the application functionalities of the setup mode and activating of the application functionalities of the client mode. In the client mode, the controlled device can, based on the activated application functionalities, communicate with other computing devices via the access point. A loop may exist to operation 802, where the controlled device may determine a trigger event to switch back to the monitor mode. Otherwise, the device may continue operating in the client mode.

At operation 840, the controlled device has also determined that the secret is valid. Operation 840 and operation 842 that depends therefrom can be performed to perform a command. In particular, at operation 840, the controlled device continues operating in the monitor mode and determines the command. For instance, the controlled device determines information about the command from the management frame that was received at operation 806 and/or from another management frame that was received from the same controlling device after the validation of the first secret. This command information can be included in a vendor element of the applicable management frame.

At operation 843, the controlled device performs the command. For instance, the controlled device determines the set of instructions that correspond to the command information, where the instructions may be pre-stored in the memory of the controlled device. Further, the controlled device executes the instructions, resulting in the command being performed. A loop may exist to operation 806, where the controlled device may continue operating in the monitor mode.

FIG. 9 illustrates an example of a flow executed by a computing device (e.g., the controlling device) for remotely controlling another computing device (e.g., the controlled device) in a monitor mode, according to embodiments of the present disclosure. The controlling device may execute an application to effectuate the remote controlling. The application may enable a user login to a user account associated with the controlled device.

As illustrated, the flow can start at operation 902, where the controlling device receives user input to control the controlled device. For instance, the application can present a user interface (e.g., a graphical user interface and/or a voice user interface) at the controlling device. The user input can be received via the user interface and can indicate a request to provision the controlled device or a request for a command that the controlled device should perform.

At operation 904, the controlling device determines a secret associated with controlling the controlled device. For instance, the application can retrieve the secret from the user account.

At operation 906, the controlling device sends a management frame to the controlled device, where the management frame indicates the secret. For instance, the management frame corresponds to a request for an association between the two devices and can include the secret in an SSID field. In an example, and prior to sending the management frame, the controlling device can request the controlled device to switch its operational mode to a monitor mode.

At operation 910, the controlling device transmits an SSID and a credential of an access point to the controlled device. This operation can be performed when the user input indicates a request for provisioning the controlled device. The application can retrieve the secret from the SSID and the credential from the user account or from local memory of the controlling device. The SSID and the credential may, but need not, be transmitted in the same management frame that was transmitted at operation 906.

At operation 920, the controlling device transmits a command to the controlled device. This operation can be performed when the user input indicates the command. The information about the command can be sent in the same management frame that was transmitted at operation 906 and/or in another management frame.

Figure 10:
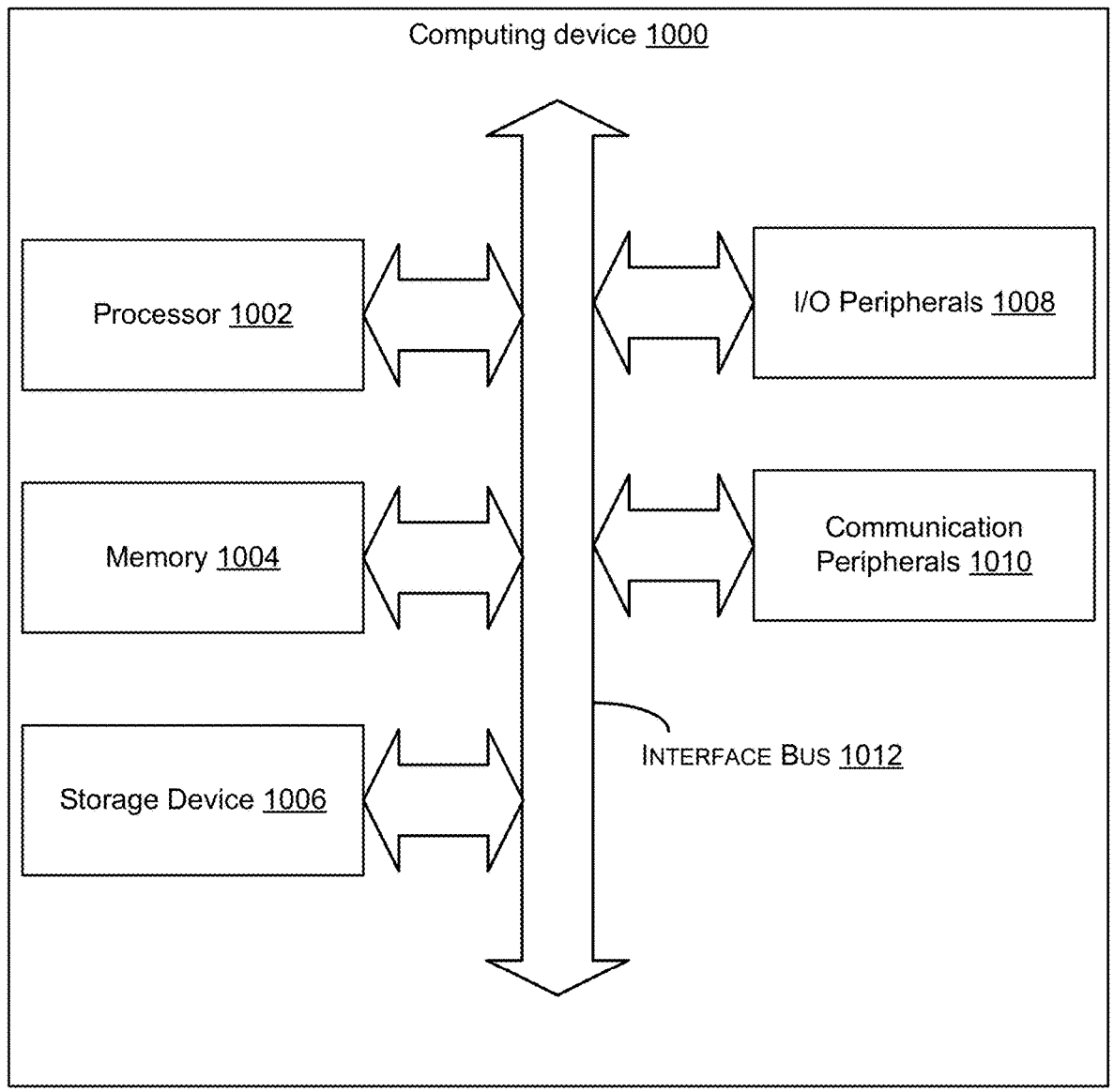
FIG. 10 illustrates an example of components of a computing device, according to embodiments of the present disclosure.

FIG. 10 illustrates an example of components of a computing device 1000 that can be a controlled device or a controlling device, according to embodiments of the present disclosure. Although the components of the computing device 1000 are illustrated as belonging to a same computing device 1000, the computing device 1000 can also be distributed (e.g., between multiple computing nodes).

The computing device 1000 includes at least a processor 1002, a memory 1004, a storage device 1006, input/output peripherals (I/O) 1008, communication peripherals 1010, and an interface bus 1012. The memory 1004 can store instructions for an EV module, where the instructions are executable by the processor 1002. Although a single processor 1002 and a single memory 1004 are illustrated, multiple processors and/or memories can be included in the computing device 1000 and physical and/or logical segregations can exist between such components to define different secure zones within the computing device 1000. The interface bus 1012 is configured to communicate, transmit, and transfer data, controls, and commands among the various components of the computing device 1000. The memory 1004 and the storage device 1006 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 1004 and the storage device 1006 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computing device 1000.

Further, the memory 1004 includes an operating system, programs, and applications. The processor 1002 is configured to execute the stored instructions and includes, for example, a logical processing unit, a microprocessor, a digital signal processor, and other processors. The memory 1004 and/or the processor 1002 can be virtualized and can be hosted within another computer system of, for example, a cloud network or a data center. The I/O peripherals 1008 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 1008 are connected to the processor 1002 through any of the ports coupled to the interface bus 1012. The communication peripherals 1010 are configured to facilitate communication between the computing device 1000 and other computing devices over a communications network and include, for example, a network interface controller, modem, wireless and wired interface cards, antenna, and other communication peripherals.

Figure 11:
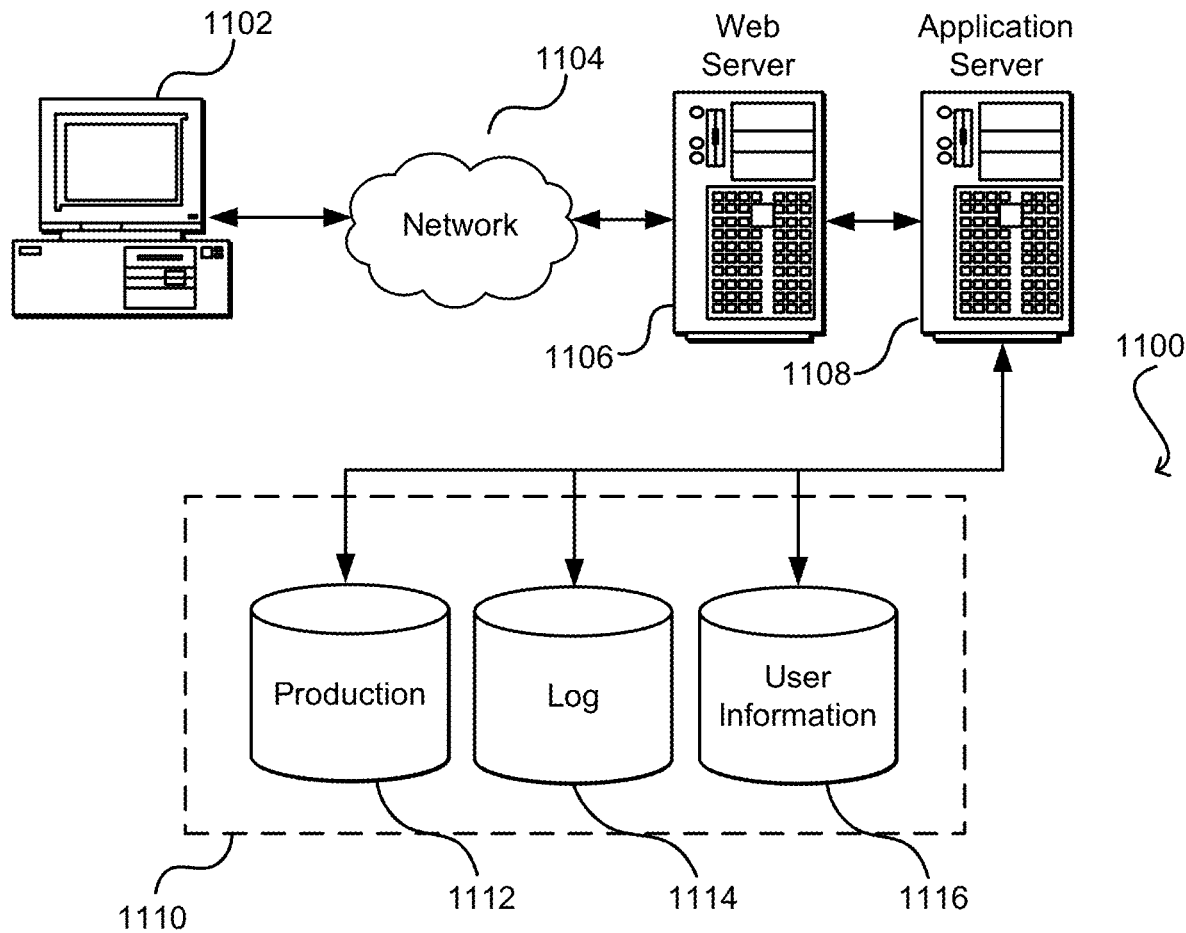
FIG. 11 illustrates aspects of an example environment for implementing aspects in accordance with various embodiments.

FIG. 11 illustrates a computer architecture diagram showing an example computer architecture, according to an embodiment of the present disclosure. This architecture may be used to implement some or all of the computing environments described herein. The computer architecture shown in FIG. 11 illustrates a server computer, workstation, desktop computer, laptop, tablet, network appliance, personal digital assistant ("PDA"), e-reader, digital cellular phone, or other computing device, and may be utilized to execute any aspects of the software components presented herein.

The computer 1100 includes a baseboard 1102, or "motherboard," which is a printed circuit board to which a multitude of components or devices may be connected by way of a system bus or other electrical communication paths. In one illustrative embodiment, one or more central processing units ("CPUs") 1104 operate in conjunction with a chipset 1106. The CPUs 1104 may be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 may provide an interface to a random access memory ("RAM") 1108, used as the main memory in the computer 1100. The chipset 1106 may further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM may also store other software components necessary for the operation of the computer 1100 in accordance with the embodiments described herein.

The computer 1100 may operate in a networked environment using logical connections to remote computing devices and computer systems through a network, such as the local area network 1120. The chipset 1106 may include functionality for providing network connectivity through a NIC 1112, such as a gigabit Ethernet adapter. The NIC 1112 is capable of connecting the computer 1100 to other computing devices over the network 1120. It should be appreciated that multiple NICs 1112 may be present in the computer 1100, connecting the computer to other types of networks and remote computer systems.

The computer 1100 may be connected to a mass storage device 1118 that provides non-volatile storage for the computer. The mass storage device 1118 may store system programs, application programs, other program modules, and data, which have been described in greater detail herein. The mass storage device 1118 may be connected to the computer 1100 through a storage controller 1114 connected to the chipset 1106. The mass storage device 1118 may consist of one or more physical storage units. The storage controller 1114 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1100 may store data on the mass storage device 1118 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1118 is characterized as primary or secondary storage, and the like.

For example, the computer 1100 may store information to the mass storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 may further read information from the mass storage device 1118 by detecting the physical states or characteristics of one or more particular locations within the physical storage units.

In addition to the mass storage device 1118 described above, the computer 1100 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 1100.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1118 may store an operating system 1130 utilized to control the operation of the computer 1100. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 1118 may store other system or application programs and data utilized by the computer 1100. The mass storage device 1118 might also store other programs and data not specifically identified herein.

In one embodiment, the mass storage device 1118 or other computer-readable storage media is encoded with computer-executable instructions which, when loaded into the computer 1100, transforms the computer from a general-purpose computing system into a special-purpose computer capable of implementing the embodiments described herein. These computer-executable instructions transform the computer 1100 by specifying how the CPUs 1104 transition between states, as described above. According to one embodiment, the computer 1100 has access to computer-readable storage media storing computer-executable instructions which, when executed by the computer 1100, perform the various routines described above. The computer 1100 might also include computer-readable storage media for performing any of the other computer-implemented operations described herein.

The computer 1100 may also include one or more input/output controllers 1116 for receiving and processing input from a number of input devices, such as a keyboard, a mouse, a touchpad, a touch screen, an electronic stylus, or other type of input device. Similarly, the input/output controller 1116 may provide output to a display, such as a computer monitor, a flat-panel display, a digital projector, a printer, a plotter, or other type of output device. It will be appreciated that the computer 1100 may not include all of the components shown in FIG. 11, may include other components that are not explicitly shown in FIG. 11, or may utilize an architecture completely different than that shown in FIG. 11. It should also be appreciated that many computers, such as the computer 1100, might be utilized in combination to embody aspects of the various technologies disclosed herein.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. One or more non-transitory computer-readable media storing instructions that, upon execution on a first device, cause the first device to perform operations comprising:
   determining, based at least in part on a user account associated with the first device and a second device, a secret associated with the second device, the second device configured to operate in a first mode in which the second device is capable of wireless data reception and incapable of wireless data transmission, and the second device further configured to operate in a second mode upon validation of the secret, wherein the second device is capable of the wireless data transmission in the second mode;
   sending, to the second device, a first management frame that includes the secret and excludes information to connect to an access point; and
   performing at least one of:
      sending, to the second device, a second management frame that includes the information such that the second device is enabled to establish a data connection to the access point upon a validation of the secret and to operate in the second mode; or
      sending, in the first management frame or the second management frame, a command indicating an operation that the second device is to execute while operating in the first mode.

2. The one or more non-transitory computer-readable media of claim 1, wherein sending the first management frame comprises sending a probe request that includes a service set identifier (SSID) field, wherein the secret is included in the SSID field.

3. The one or more non-transitory computer-readable media of claim 1 storing further instructions that, upon execution on the first device, cause the first device to perform additional operations comprising:
   receiving user input indicating a request to connect the second device to the access point;
   requesting, based at least in part on the user input and from a set of servers that store user account information, device information associated with the second device;
   receiving, from the set of servers, the device information; and
   generating the secret based at least in part on the device information.

4. A method implemented on a first device, the method comprising:
   determining, based at least in part on a user account associated with the first device and a second device, a secret associated with the second device, the second device configured to operate in a first mode in which the second device is capable of wireless data reception and incapable of wireless data transmission, and the second device further configured to operate in a second mode upon validation of the secret, wherein the second device is capable of the wireless data transmission in the second mode;
   sending, to the second device, a first management frame that includes the secret and excludes information to connect to an access point; and
   performing at least one of:
      sending, to the second device, a second management frame that includes the information such that the second device is enabled to establish a data connection to the access point upon a validation of the secret and to operate in the second mode; or
      sending, in the first management frame or the second management frame, a command indicating an operation that the second device is to execute while operating in the first mode.

5. The method of claim 4, wherein sending the first management frame comprises sending an association request to establish an association between the first device and the second device, and wherein the association request comprises the secret as a service set identifier (SSID) for the association.

6. The method of claim 4, further comprising:
   determining, based at least in part on the user account, an identifier of the second device;
   generating a hash of the identifier, wherein the secret includes the hash; and
   including the hash in a service set identifier (SSID) field of the first management frame.

7. The method of claim 4, further comprising:
determining, based at least in part on the user account, an identifier and a public key of the second device;
generating encrypted data by at least encrypting the identifier using the public key, wherein the secret includes the encrypted data; and
including the encrypted data in a service set identifier (SSID) field of the first management frame.

8. The method of claim 4, further comprising:
including the secret in a service set identifier (SSID) field of the first management frame; and
including command data indicating the command in a vendor element of the first management frame.

9. The method of claim 4, further comprising:
including the secret in a service set identifier (SSID) field of the first management frame and an identifier of the first device in a first header of the first management frame; and
including command data indicating the command in a vendor element of the second management frame and the identifier of the first device in a second header of the first management frame.

10. The method of claim 4, further comprising:
including the secret in a first service set identifier (SSID) field of the first management frame; and
including an SSID and a credential of the access point in a second SSID field of the second management frame, wherein the information includes the SSID and the credential.

11. The method of claim 4, further comprising:
generating sensor data by a sensor of the first device,
generating device information about the second device based at least in part on the sensor data; and
sending, to a set of servers, the device information, wherein the secret is generated based at least in part on the device information.

12. The method of claim 11, further comprising:
receiving user input indicating a request to connect the second device to the access point;
requesting, based at least in part on the user input, the secret from the set of servers;
receiving, from the set of servers, the secret; and
including the secret in a payload of the first management frame.

13. A first device comprising:
one or more processors; and
one or more memories storing computer-readable instructions that, upon execution by the one or more processors, configure the first device to:
determine, based at least in part on a user account associated with the first device and a second device, a secret associated with the second device, the second device configured to operate in a first mode in which the second device is capable of wireless data reception and incapable of wireless data transmission, and the second device further configured to operate in a second mode upon validation of the secret, wherein the second device is capable of the wireless data transmission in the second mode;
send, to the second device, a first management frame that includes the secret and excludes information to connect to an access point; and
perform at least one of:
sending, to the second device, a second management frame that includes the information such that the second device is enabled to establish a data connection to the access point upon a validation of the secret and to operate in the second mode; or
sending, in the first management frame or the second management frame, a command indicating an operation that the second device is to execute while operating in the first mode.

14. The first device of claim 13, wherein the one or more memories store further computer-readable instructions that, upon execution by the one or more processors, configure the first device to:
generate optical data by an optical sensor of the first device,
generate device information about the second device based at least in part on the optical data; and
send, to a set of servers, the device information, wherein the secret is generated based at least in part on the device information.

15. The first device of claim 14, wherein the one or more memories store additional computer-readable instructions that, upon execution by the one or more processors, configure the first device to:
receive user input indicating a request to connect the second device to the access point;
request, based at least in part on the user input, the device information from the set of servers;
receive, from the set of servers, the device information and a public key of the second device; and
generate the secret based at least in part on the device information and the public key.

16. The first device of claim 13, wherein prior to the first management frame being sent to the second device, the secret is stored by the first device and a copy of the secret is stored by the second device.

17. The first device of claim 13, wherein the information includes a service set identifier (SSID) and a credential of the access point, wherein the SSID and the credential are included in the second management frame and are sent while the second device is operating in the first mode.

18. The first device of claim 13, wherein the information includes a service set identifier (SSID) of the access point, wherein the SSID is included in the second management frame and is sent while the second device is operating in the first mode, and wherein the one or more memories store further computer-readable instructions that, upon execution by the one or more processors, configure the first device to:
send, to the second device while the second device is operating in the first mode, a third management frame that includes a credential of the access point.

19. The first device of claim 13, wherein command data indicating the command is included in the second management frame based at least in part on a byte size of the command data.

20. The first device of claim 13, wherein command data indicating a plurality of commands is included in the second management frame such that the second device performs the plurality of commands while operating in the first mode.

* * * * *